(12) United States Patent
Brunet et al.

(10) Patent No.: US 7,581,400 B2
(45) Date of Patent: Sep. 1, 2009

(54) ELBOW-SHAPED PROPULSION GAS EXHAUST ASSEMBLY IN AN AIRCRAFT

(75) Inventors: Edgar Brunet, Neuilly sur Seine (FR); Thomas Daris, Paris (FR); Alain Pierre Page, Montgeron (FR); Jackie Raymond Julien Prouteau, Villecresnes (FR)

(73) Assignee: SNECMA, Paris (FR)

( * ) Notice: Subject to any disclaimer, the term of this patent is extended or adjusted under 35 U.S.C. 154(b) by 140 days.

(21) Appl. No.: 11/741,346

(22) Filed: Apr. 27, 2007

(65) Prior Publication Data

US 2007/0284005 A1    Dec. 13, 2007

(30) Foreign Application Priority Data

Apr. 28, 2006    (FR)    ................... 06 51545

(51) Int. Cl.
    *F02K 1/00*    (2006.01)
(52) U.S. Cl. ..................... 60/770; 239/265.35
(58) Field of Classification Search ............... 60/770, 60/230; 239/265.25, 265.35
    See application file for complete search history.

(56) References Cited

U.S. PATENT DOCUMENTS

| | | | |
|---|---|---|---|
| 3,631,678 A | | 1/1972 | Reed |
| 4,007,587 A | * | 2/1977 | Banthin et al. ............... 60/204 |
| 4,050,631 A | * | 9/1977 | Syltebo ................ 239/265.25 |
| 4,228,652 A | * | 10/1980 | Short .......................... 60/263 |
| 4,533,095 A | * | 8/1985 | Yates ....................... 244/23 D |
| 4,835,961 A | * | 6/1989 | Presz et al. .................... 60/264 |
| 5,170,964 A | | 12/1992 | Enderle et al. |
| 5,271,222 A | * | 12/1993 | Coe et al. ..................... 60/229 |
| 6,112,513 A | | 9/2000 | Catt et al. |
| 2002/0189232 A1 | | 12/2002 | Weiland et al. |

FOREIGN PATENT DOCUMENTS

WO    WO 00/40851    7/2000

OTHER PUBLICATIONS

U.S. Appl. No. 11/741,346, filed Apr. 27, 2007, Brunet et al.
U.S. Appl. No. 11/741,338, filed Apr. 27, 2007, Brunet et al.
U.S. Appl. No. 11/741,393, filed Apr. 27, 2007, Daris et al.

* cited by examiner

*Primary Examiner*—Michael Cuff
*Assistant Examiner*—Phutthiwat Wongwian
(74) *Attorney, Agent, or Firm*—Oblon, Spivak, McClelland, Maier & Neustadt, P.C.

(57) ABSTRACT

A propulsion gas exhaust assembly is presented for use in an aircraft propelled by hot gases produced along the axis of the latter by a gas generator. The assembly may include a first cylindrical duct, two second ducts, two third ducts, and two axial gas-ejection nozzles. The first cylindrical duct element receives the gases downstream of the gas generator. The gasses flow downstream from the first cylindrical duct element to two second duct elements. These two second duct elements are divergent in a first geometric plane. Each of the two second duct elements may guide the flow to their own respective third duct and nozzle. The third ducts may include elbows to assist in stealth. The nozzles may include the means to steer the aircraft.

20 Claims, 4 Drawing Sheets

ELBOW-SHAPED PROPULSION GAS EXHAUST ASSEMBLY IN AN AIRCRAFT

The invention relates to the field of aircraft propulsion by ejection of gas flows, and relates to the exhaust assembly downstream of the gas generator up to the nozzle.

BACKGROUND OF THE INVENTION

For aircraft propelled by turbojets, with or without pilot, drones, for military applications, one objective is stealth.

Stealth is defined in particular in relation to two parameters: the radar cross section (RCS) and the infrared signature (IRS). The RCS is the surface area likely to appear on a radar, taking account of the geometry of the aircraft. The IRS is the heat signature that the aircraft leaves, particularly at its ejection nozzles.

DESCRIPTION OF THE PRIOR ART

To reduce this heat signature, or even delete it, it is a known practice to mask the infrared radiation emitted by the hot gases exiting the gas generator. For example U.S. Pat. No. 3,693,880 is known that describes a device of this type. It comprises a screen placed in the gas exhaust channel while being at a distance from the walls of the latter and held by radial arms. It has an aerodynamic shape guiding the gases in the best way possible along its profile and its surface is cooled by the colder air carried by the radial arms. The circular-section duct becomes annular between the screen and the wall of the duct. The flow again becomes of circular section downstream of the screen to be exhausted through a nozzle. The diameter of the duct becomes larger at this location and follows a profile parallel to that of the screen to conserve a sufficient opening. The maximum diameter of the screen is sufficient to mask the turbine from view from the rear. In addition the downstream portion of the screen has a double wall traversed by the cooling air in order to prevent any heating thereof.

The present applicant has furthermore developed a double nozzle, called a bifid nozzle, in which the gas flow exiting from the gas generation means is divided into two flows and guided to two nozzles. The two flows of equal size are ejected in parallel in the axis of the thrust. The advantage of this arrangement is to allow the guidance of the aircraft, particularly in yaw by a control of the two flows either by orientation of their thrust vector or by the delivery rates. Being separated from one another, they are also offset from the axis of the generator. In this manner, in the case where the generator means comprises a turbine, the latter is capable of being invisible from the rear through the opening of the nozzles. The infrared signature is therefore small.

SUMMARY OF THE INVENTION

The subject of the present invention is an exhaust device whose infrared signature is further reduced relative to the former solution. The invention succeeds in achieving this objective with a propulsion gas exhaust assembly, in an aircraft propelled by hot gases produced along the axis of the latter by a gas generator, comprising a duct and a nozzle, wherein said duct comprises a first cylindrical duct element receiving the gases and communicating downstream with two second duct elements, the directions of which are divergent in a first plane, each of the two duct elements communicating downstream with a third duct element which emerges in an axial gas-ejection half-nozzle, at least one of the third ducts forms an elbow defined by a first part guiding the gas flow in a radial direction away from the axis and a second part downstream of the first that guides the gas flow in a radial direction toward the axis, in such a manner that the hot zones inside the duct upstream of the assembly are not visible from the rear.

The term "half-nozzle" is understood in the present application to mean a gas-ejection nozzle that receives part of the main flow downstream of the turbine. This term is not associated with any particular shape.

According to another feature, at least one of the third duct elements forms an elbow, preferably in a second plane, possibly different from the first plane. In the latter case, the second plane is preferably perpendicular to the first plane. According to one embodiment, the cross section of the third duct elements has an elongate shape in the horizontal direction.

In the present application, the term "elbow" is understood in the following manner. The duct element comprises a first portion guiding the gas flow in a radial direction away from the axis and a second portion downstream of the first, guiding the gas flow in a radial direction toward the axis. Downstream of the elbow, the flow is returned to the axis.

More particularly, the two third duct elements each form an elbow, the elbows having opposite directions to each other, especially in the vertical plane, one upward and the other downward, and the two half-nozzles are in the same plane, parallel to the first.

According to one particular embodiment, the two second duct elements have semicylindrical entrances with a separation parallel to said first plane. However, other configurations for this part of the exhaust are possible.

Surprisingly, it has been found that by bending the gas flow in this manner it was possible to effectively mask not only the disk of the turbine but also the hottest portions downstream of the latter by temperature homogenization. Furthermore, this concept also makes it possible to design a transition zone minimizing the aerodynamic pressure drops while favoring the mixture of the gases before ejection.

The present invention applies in particular to the case in which the gas generator is a bypass turbojet with a hot central primary flow coming from the turbine, surrounded by a secondary flow coming directly from the fan, and therefore at a low temperature. In an engine of this type, it has been found that a temperature distribution very favorable as regards the infrared signature is obtained. By separating into two flows and by twisting two ducts, both parts of the gas flow that are located on the periphery lie on the side of the walls located close to the engine axis. Insofar as the half-nozzles have vertical partitions that are located close to the axis and are elongate relative to the partitions away from the axis, and therefore particularly vulnerable to direct view via the sides and the rear, these benefit from being swept by both parts of the gas flow at lower temperature. Their infrared signature is thereby reduced.

The invention also relates to the guidance capability supplied by this type of exhaust. The solution described in the patent application filed by the present applicant under number FR 05 51 857 has been applied. Specifically, in the case of a nozzle as intended to be fitted to a military drone, an objective of IRS and RCS stealth is linked with the need for vectored thrust. This leads to designing very flat two-dimensional nozzles, with an elongation of the order of 5 for IRS and RCS stealth and with a pointed external shape for RCS stealth.

A further object of the present invention is the production of an aircraft controlling device, particularly for controlling an aircraft in yaw, that is effective, associated with a control of the engine delivery rate and applicable to single-engined or twin-engined aircraft and in particular to drones.

This device must be capable of continuously providing a low amplitude vectorization without causing a gas generator performance penalty.

It must be capable of providing a major vectored thrust for the needs of controlling the aircraft.

These objectives are achieved with the exhaust assembly presented above, which is shaped so as to divide a main propulsion gas flow into a first and a second flow for an ejection into a first and a second half-nozzle and comprising at least one of the following two controlling means: a means of distributing the main flow into each of the two half-nozzles and a means of orienting the thrust vector produced by each of the two half-nozzles.

Advantageously, at least one of said two means, preferably both, use fluid injection and still preferably the exhaust assembly comprises said two means. This solution has the advantage of being simple and of operating with a reduced number of fluid injection devices, ensuring a high reliability and low cost.

In the first place, said half-nozzles are placed for a yaw orientation of the thrust vector. In this way the absence of a vertical stabilizer is alleviated.

According to one variant, said half-nozzles are placed for a pitch or roll control or else the nozzle comprises two pairs of half-nozzles, for example one for the yaw orientation, the other for the pitch orientation.

According to another feature, the means for controlling the distribution of the flows comprises means for fluid injection at the throat of each of the half-nozzles. More precisely, the gas generator being a turbojet, the fluid injection means are supplied by the air that can be tapped from the compressor of the generator. This solution is particularly advantageous because it allows a balanced operation in all the flight phases. Particularly, a nozzle operation procedure is planned according to which the air is continuously tapped from the generator compressor.

According to a variant embodiment, the main flow is generated by two gas generators. In this case, the exhaust assembly preferably comprises only one means of orienting the thrust vector produced by each of the two half-nozzles.

BRIEF DESCRIPTION OF THE DRAWINGS

The invention is now described in greater detail with reference to the appended drawings in which.

DESCRIPTION OF THE PREFERRED EMBODIMENTS

Figure 1:
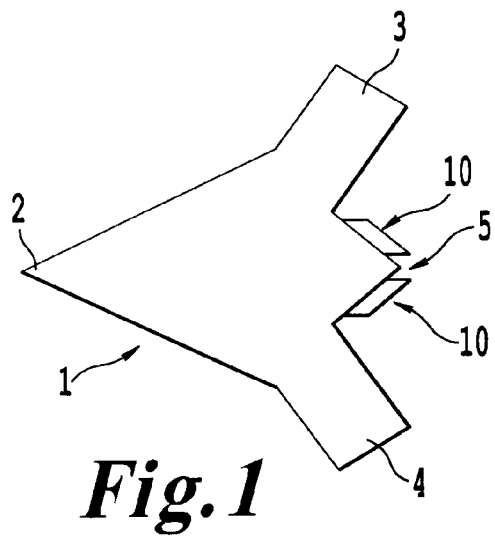
FIG. 1 shows in a top view an example of an aircraft to which the invention is applied.

The aircraft 1 represented in the figure is a nonlimiting example. It has a nose 2, two wings 3 and 4 and is propelled by one or two turbojets that are not visible. It is shaped so as to have the smallest possible RCS and IRS. Its rear portion in particular has no vertical stabilizer and terminates in a point 5 with an appropriate apex angle, for example 40°, to reject the radar waves to infinity. The exhaust assembly 10 participates in this requirement by being bifid. It distributes the main flow exiting the channel 12 at the entrance into two flows in two symmetrical channels 12A and 12B that terminate in two half-nozzles 14 and 16 of rectangular section. The channels 12, 12A and 12B have a shape suitable for ensuring the separation of the flow into two flows but also the transition from a circular or substantially circular section cylindrical shape to a rectangular section shape. Where appropriate, the channels include an additional elbow for masking the turbine. As may be seen in the figures, this masking is already at least partly provided by the separation between the half-nozzles 14 and 16.

Figure 2:
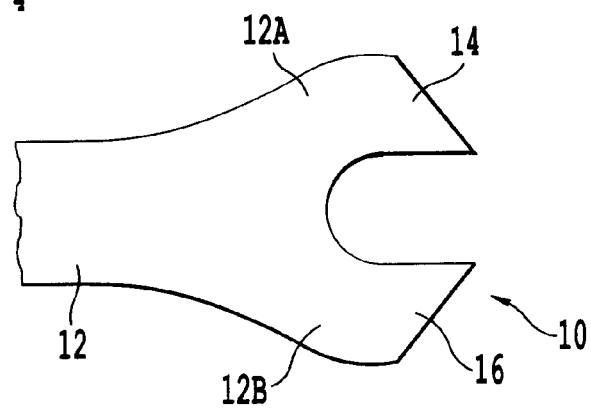
FIG. 2 shows in a top view a nozzle of the bifid type.

According to the present application, the shape of the exhaust assembly is enhanced so as to ensure the masking of the turbine block irrespective of the position of a rear observer. As may be seen in FIG. 2, part of the bifid nozzle, because of its beveled ejection plane, is visible when viewed from the side. This therefore also reduces the signature.

With reference to FIGS. 3-7 and 10-12, the geometry of the exhaust assembly 20 according to the invention can be seen.

This assembly comprises a duct which consists of duct elements that may be distinguished in the following way.

A cylindrical tubular first element 21 at the entrance, with an entrance plane 21A that receives the gases from the gas generator of the turbine in the case of a gas turbine engine. The present invention preferentially applies to the case of propulsion by a bypass turbojet. At the entrance, the hot primary flow is central and the cool secondary flow is on the periphery.

Figure 4:
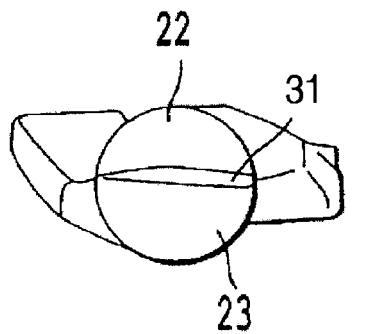
FIGS. 4 to 6 show the assembly of FIG. 3 seen respectively from the front, from behind and in rear three-quarter perspective.
Figure 5:
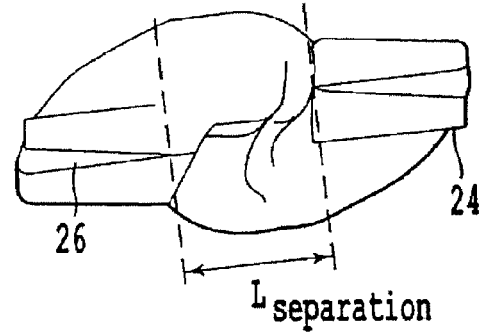
Figure 6:
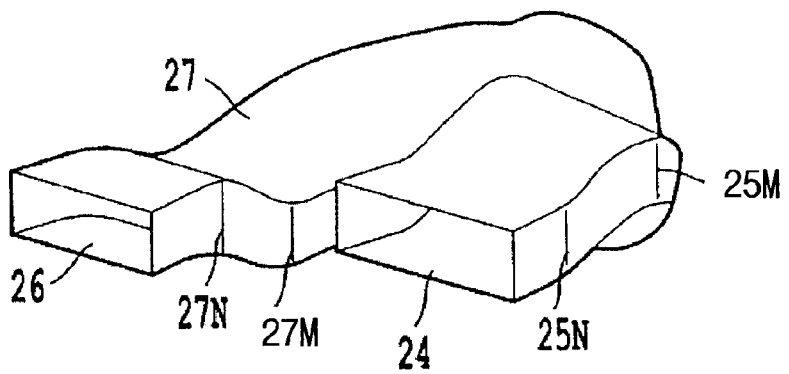

This duct element 21 opens into two superposed second duct elements 22 and 23 of semicylindrical shape with a horizontal geometric plane of separation which may be clearly seen in FIG. 4. These two elements 22 and 23 are oriented in two directions that diverge in the plane parallel to their plane of separation, called the first geometric plane 31. The two gas flows move apart in this portion. They extend over a sufficient axial length until their exit planes 22s and 23s do not overlap and are thereby on different sides of the second geometric plane 32. The exit planes 22s and 23s are substantially side by side. Each element 22 and 23 thus emerges in a third duct element, 25 and 27 respectively, lying parallel. The two second duct elements 25 and 27 are oriented substantially along the XX axis of the engine. These two third duct elements 25 and 27 each open into a half-nozzle 24 and 26 respectively. By half-nozzles is meant the two half-nozzles that together guide the flow from the gas generator toward the outside.

Figure 3:
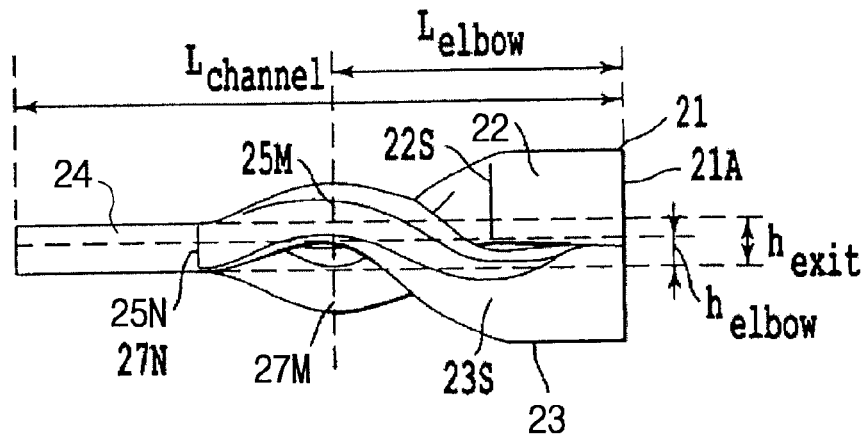
FIG. 3 shows, in a side view, an exhaust assembly according to the invention.
Figure 12:
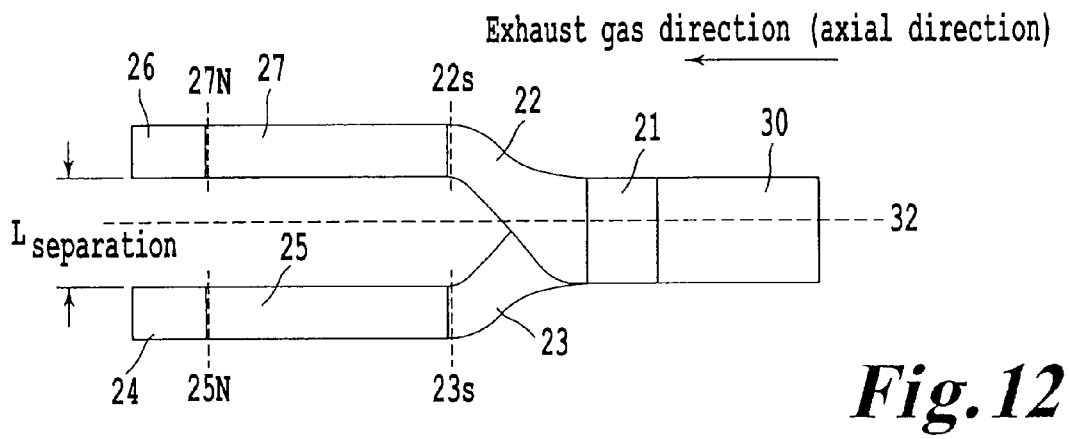
FIG. 12 shows a top schematic view of the exhaust assembly in FIG. 3.

By moving axially downstream from the transverse planes 22s and 23s, it may be seen in FIGS. 3 and 12 that the two duct elements 25 and 27 lie, parallel to the vertical plane, called the second geometric plane 32, along intersecting opposed directions and diverge from each other until reaching a maximum separation at 25M and 27M, again converge on each other until reaching 25N and 27N. In this position, the two duct elements 25 and 27 are in the same horizontal plane at the height of the XX axis of the engine. This plane is coincident with or parallel to the first geometric plane 31.

Each element 25 and 27 emerges in a half-nozzle, 24 and 26 respectively. As may be seen in FIG. 5, the two nozzles are a certain distance apart in the horizontal plane or first plane. They are separated by a distance $L_{separation}$.

In this embodiment, it may be seen that the first plane is horizontal and the second plane is vertical. It will be understood that the two planes may pivot about the XX axis without departing from the scope of the invention, the first plane becoming vertical and the second plane becoming horizontal.

The characteristic dimensions of this exhaust assembly are the following:

$L_{elbow}$ is the length of the assembly from the entrance plane 21A to the elbow, that is to say the transverse plane 25M, 27M;

$L_{channel}$ is the length from the entrance plane 21A to the exit plane of the nozzle;

$h_{elbow}$ is the height of the elbow relative to the lower wall of the nozzle exit, that is to say the height of the internal wall at 25m or 27m;

$h_{exit}$ is the height of the nozzle at the exit.

The exhaust assembly has at least one of the following relationships between these parameters:

the $L_{elbow}/L_{channel}$ ratio is between 0.5 and 0.7;

$h_{elbow}/h_{exit} \geq 1+L_{elbow}/L_{channel}$;

$L_{separation}/L_{channel}$ between 0.3 and 0.5.

As illustrated by the straight lines D1 and D2, such a geometry allows effective masking of the hot zones of the engine that lie within the limits of visibility defined by these straight lines. Furthermore, if the gas generator 30 is a bypass turbojet with a cool secondary flow, this geometry makes it possible for the fresh air coming from the secondary flow to be progressively brought onto the visible parts of the nozzle in order to reduce its infrared signal.

Figure 10:
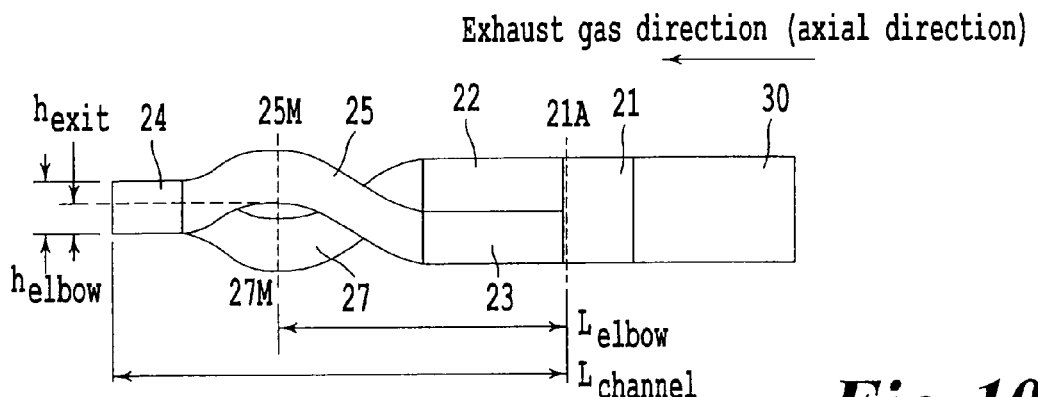
FIG. 10 shows a side schematic view of the exhaust assembly in FIG. 3.
Figure 11:
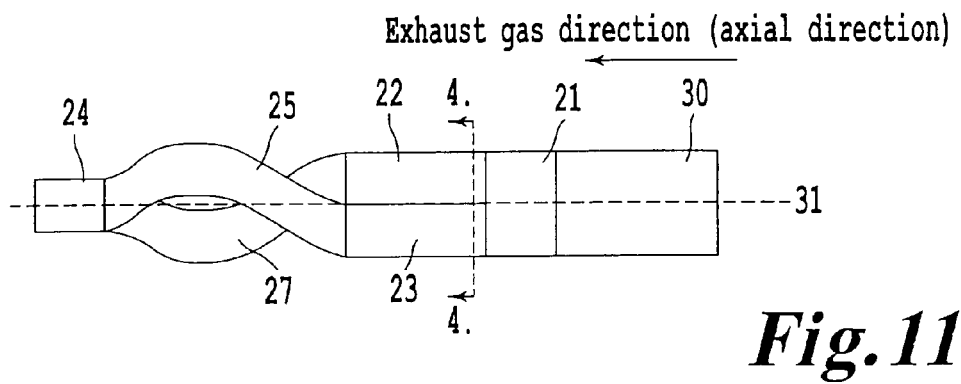
FIG. 11 shows a side schematic view of the exhaust assembly in FIG. 3.

FIGS. 10, 11 and 12 are schematic drawings illustrating one embodiment of the exhaust assembly in the present invention. The first cylindrical duct 21 is downstream of the gas generator 30 and they may be attached. The first cylindrical duct 21 receives gases from the gas generator 30 and the gases exit from the first cylindrical duct 21 at cross-section 21A. A second duct branch-one 22 receives a first gas portion and a second duct branch-two 23 receives a second gas portion from the first cylindrical duct 21. As shown in FIGS. 10-12, the second duct branch-one 22 and the second duct branch-two 23 keep first and second gas portions on different sides of a first geometric plane 31. Ducts 22, 23 also guide the first and second gas portions away from a second geometric plane 32. The first and second gas portions can enter a third duct branch-one 27 and a third duct branch-two 25 and can exit at 27N and 25N respectively. The third duct branch-one 27 and the third duct branch-two 25 can be disposed parallel to the second geometric plane 32 and may be separated from each other by a distance $L_{separation}$. As shown by FIG. 10, the third duct branch-one 27 and the third duct branch-two 25 can contain non-linear portions or elbows to guide the first and second gas portions away from the first geometric plane 31 to branch-one cross-section 27M and branch-two cross-section 25M respectively before guiding the first and second gas portions back towards the first geometric plane 31. The first and second gas portions may exit from the third duct branch-one 27 and the third duct branch-two 25 respectively at cross-sections 27N and 25N. As shown in FIG. 12, the first gas portion from the second duct branch-one 22 can flow downstream to exit from a branch-one nozzle 26. The second gas portion from the second duct branch-two 23 can flow downstream to exit from a branch-two nozzle 24.

Figure 7:
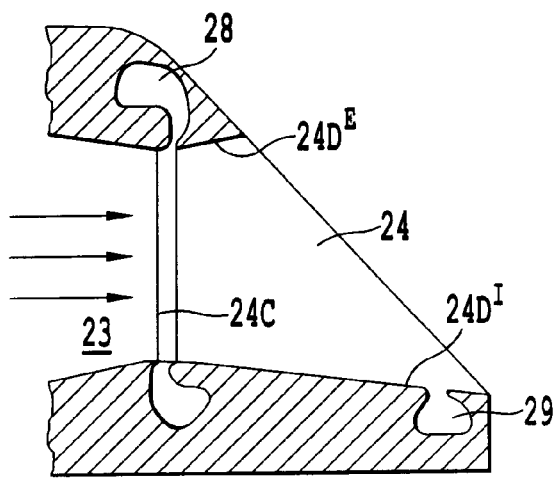
FIG. 7 is a schematic representation of the arrangement of the control means of the invention in a half-nozzle.
Figure 8:
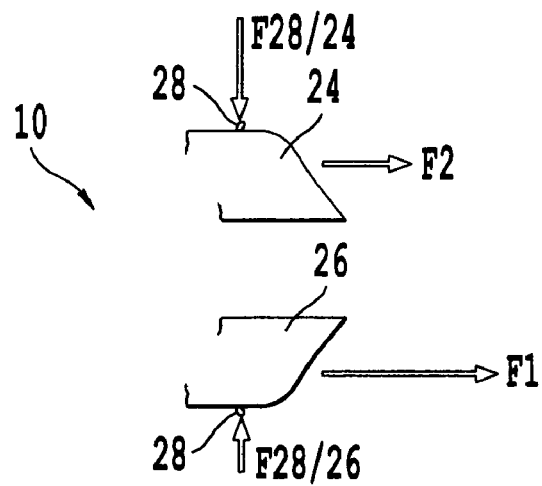
FIG. 8 illustrates the operation of the control means placed at the throat.
Figure 9:
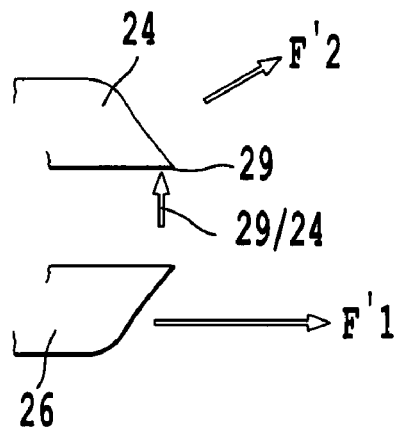
FIG. 9 illustrates the operation of the control means placed in the divergence of the half-nozzles.

The means of yaw guidance of the aircraft will now be described with reference to FIGS. 7 to 9. In this example, each of the half-nozzles consists of a rectangular throat, 24C and 26C respectively, with a high horizontal elongation, width/height ratio, as seen in FIG. 7. The elongation of the nozzles may be 2.5. Downstream of the throat, the divergence is formed by two vertical walls. It is short on the external side $24D^E$ and $26D^E$. The vertical walls on the internal side $24D^I$ and $26D^I$ are longer. This gives a beveled shape of the downstream edge of the nozzles, 24 and 26. The top and bottom walls are either parallel with one another or divergent. It may be seen that, compared with the arrangement of the exhaust assembly described above, that the vertical walls on the internal side are, thanks to the invention, swept with cooler gas coming from the secondary flow of the bypass turbojet forming the gas generator. Their infrared signature is reduced.

The assembly is preferably optimized to provide, in the cases with no injection and no vectorization, a minimum transverse thrust of each half-nozzle. Specifically, the latter results in a loss of axial thrust that must be reduced to a minimum. The overall lateral thrust remains zero because of the symmetry of the system.

According to a feature of the invention, to provide the guidance of the aircraft 1 without a tail unit, control means are provided by which action is taken on the two flows.

The convergent-divergent nozzle, for example 24, comprises the neck 24C and downstream the two divergent walls $24D^I$ and $24D^E$. Here the nozzle comprises a fluid injector 28 placed on a wall at the throat and a fluid injector 29 situated on the wall $24D^I$ of the divergence. The injector is preferably situated close to the end of the divergence.

In a symmetrical manner, the half-nozzle 26 is fitted with a fluid injector 28 at the throat 26C and a fluid injector 29 on the wall of divergence $26D^I$.

The injectors 28 and 29 are advantageously supplied with air tapped from the turbojet compressor that supplies the main flow, as appropriate.

Operation is as follows. FIG. 8 shows by arrows 28/24 and 28/26 the air injections via the injectors 28. The yaw moment is created by controlling the distribution of the delivery rate in each of the two half-nozzles 24 and 26 by means of fluid injections at the two throats. The value of the delivery rate is illustrated by the length of the arrow, and here one arrow is longer than the other. According to this example, the half-nozzle 24 receives a strong injected delivery rate 28/24, and consequently sustains a major restriction of the effective section at the throat. Conversely, the half-nozzle 26 receives little or no delivery rate at the throat. The result of this is the creation of an axial thrust differential. The thrust F1 on the half-nozzle 26 is greater than the thrust F2 on the half-nozzle 24. The result of this is a yaw moment.

It is observed however that a sudden obstruction of the nozzle would instantaneously create an increase in pressure in the channel and a risk of pumping the compressor. According to a preferred operating mode, a nominal permanent injection is created. This is done at equal delivery rate tapped off in such a way that the generator does not undergo a sudden variation during the mission while regulating the nozzle at total equal effective section at the throat. The thermodynamic cycle of the engine is directly optimized under this constraint of constant tapping. In this manner, the system of regulating the tapped air operates continuously and does not undergo any transitional startup phase.

Therefore this operating mode in accordance with the invention provides, with a low impact on the performance of the engine, a vectored thrust that makes it possible to compensate for the absence of cell tail unit, particularly for cruising or slow transitional speeds.

The operation of the injection device situated in the divergence of the nozzles 24 and 26 is now described with reference to FIG. 9.

The injectors 29, in this embodiment, are preferably placed at the end of the long wall of divergence. By injecting a fluid into the nozzle 24, the direction of which is represented by the arrow 29/24, a deviation of the thrust vector produced by the nozzle and shown by the arrow F'2 is induced. The thrust F'1 provided by the half-nozzle 26 remains axial since nothing disrupts its direction. This results in the creation of a yaw moment relative to the center of gravity of the aircraft. This operating mode provides a substantial vectored thrust in order to control the aircraft, to the detriment however of the performance of the generator. This deterioration is however controlled.

One embodiment of the invention has been described. However, many variants are possible without departing from the context of the invention. For example, a channel has been shown supplied by a single gas generator. In the case of a twin-engined aircraft, the two half-flows of exhaust are generated by two distinct engines whose regulation is synchronized. Preferably, only the injectors in the divergence are used.

Variants of the arrangement and operation of the control means comprise the presence of a single control means. It is possible to operate it at the same time as the other means or separately.

According to an embodiment not shown, the nozzles may be of the fluid type with ejector, that is to say a secondary flow emerging in or downstream of the main channel.

The control means according to the invention may be combined partly with mechanical means of orienting the flows. Where appropriate, the control means may be entirely mechanical.

The invention claimed is:

1. A propulsion gas exhaust assembly for an aircraft, comprising:
    a gas generator providing a hot gas and having a hot zone surface; a first cylindrical duct disposed downstream of the gas generator and configured to guide the hot gas from the gas generator, a first geometric plane being parallel to the axis of the first cylindrical duct and intersecting the first cylindrical duct, the first geometric plane having a branch-one side and a branch-two side, a second geometric plane being orthogonal to the first geometric plane and containing the entire axis of the first cylindrical duct, the second geometric plane having a first side and a second side;
    a second duct branch-one disposed downstream of the first cylindrical duct and configured to guide a first gas portion from the first cylindrical duct, keep the first gas portion on the branch-one side, and to guide the first gas portion away from the second geometric plane;
    a second duct branch-two disposed downstream of the first cylindrical duct and configured to guide a second gas portion from the first cylindrical duct, keep the second gas portion on the branch-two side, and to guide the second gas portion away from the second geometric plane, the first and second gas portions are fully on separate sides of the second geometric plane when they exit from the second duct branch-one and the second duct branch-two respectively;
    a branch-one nozzle disposed downstream of the second duct branch-one and which guides the first gas portion outside the assembly in a direction substantially parallel to the axis of the first cylindrical duct;
    a branch-two nozzle disposed downstream of the second duct branch-two and which guides the second gas portion outside the assembly in the direction substantially parallel to the axis of the first cylindrical duct; and
    a third duct branch-one disposed downstream of the second duct branch-one and upstream of the branch-one nozzle,
    wherein the assembly being configured to allow the first gas portion to enter into and exit from the third duct branch-one in an axial direction, the axial direction being parallel to the axis of the first cylindrical duct, the third duct branch-one having a branch-one elbow configured to guide the first gas portion away from the first geometric plane to a maximum offset position before guiding the first gas portion to a new first offset position closer to the first geometric plane, and wherein the hot zone surface is masked from a view directed upstream into the branch-one nozzle.

2. The assembly of claim 1, wherein a ratio of a separation distance between the branch-one and branch-two nozzles and a distance between an exit of the branch-one nozzle to the entrance of the second duct branch-one measured parallel to the axis of the first cylindrical duct, is in a range of 0.3 to 0.5.

3. The assembly of claim 1, wherein the third duct branch-one having the branch-one elbow is disposed parallel to the second geometric plane.

4. The assembly of claim 3, wherein the second geometric plane is orthogonal to the first geometric plane.

5. The assembly of claim 1, wherein the assembly further comprises:
    a third duct branch-two disposed downstream of the second duct branch-two and upstream of the branch-two nozzle,
    wherein the assembly being configured to allow the second gas portion to enter into and exit from the third duct branch-two in the axial direction, the third duct branch-two having a branch-two elbow configured to guide the second gas portion away from the first geometric plane to a second maximum offset position before guiding the second gas portion to a new second offset position closer to the first geometric plane, the third duct branch-two is disposed parallel to the second geometric plane, the first and second gas portions are configured to become more distant from each other as the first gas portion travels through the branch-one elbow towards the maximum offset position and the second gas portion travels through the branch-two elbow towards the second maximum offset position,
    wherein the hot zone surface is masked from a view directed upstream into the branch-two nozzle.

6. The assembly of claim 5, wherein both the third duct branch-one and the third duct branch-two have a plurality of cross sections that are elongated in the direction parallel to the first geometric plane.

7. The assembly of claim 6, wherein the branch-one nozzle and the branch-two nozzle are together disposed parallel to the first geometric plane.

8. The assembly of claim 7, wherein the second duct branch-one and the second duct branch-two each have semi-cylindrical entrances with a separation parallel to the first geometric plane.

9. The assembly of claim 6, wherein the assembly is configured to divide the hot gas into the first and second gas portions for ejecting into the branch-one and branch-two nozzles utilizing at least one of the following two controlling techniques:

a means for apportioning hot gas into the first and second gas portions, and a means for orienting a thrust vector produced by each of the branch-one and branch-two nozzles.

10. The assembly of claim 9, wherein the two controlling techniques are means for injecting a compressed air into each of the branch-one and branch-two nozzles.

11. The assembly of claim 10, wherein the branch-one and branch-two nozzles are configured on the aircraft for a yaw orientation of a thrust vector.

12. The assembly of claim 11, wherein the branch-one and branch-two nozzles are configured on the aircraft for a pitch orientation or a roll control.

13. The assembly of claim 11, wherein the assembly also comprises:
a branch-three nozzle downstream of the gas generator; and
a branch-four nozzle downstream of the gas generator,
wherein the branch-three and the branch-four nozzles are configured on the aircraft for the pitch orientation.

14. The assembly of claim 6, wherein the branch-one nozzle is a convergent-divergent nozzle having a first throat, the branch-two nozzle is a convergent-divergent nozzle having a second throat, the assembly divides the hot gas into the first and second gas portions using a means for fluid injection at the first and second throats.

15. The assembly of claim 14, wherein the gas generator comprises a turbojet having a compressor, the assembly configured to divide the hot gas into the first and second gas portions by receiving a continuous airflow from a compressor tap and injecting the continuous airflow into the first and second throats.

16. The assembly of claim 15, wherein the gas generator includes two turbojets.

17. A turbomachine comprising:
a gas generator providing a hot gas, the gas generator configured to be disposed within an aircraft and having a hot zone surface;
a first cylindrical duct disposed downstream of the gas generator and configured to guide the hot gas from the gas generator, a first geometric plane being parallel to the axis of the first cylindrical duct and intersecting the first cylindrical duct, the first geometric plane having a branch-one side and a branch-two side, a second geometric plane being orthogonal to the first geometric plane and containing the entire axis of the first cylindrical duct, the second geometric plane having a first side and a second side;
a second duct branch-one disposed downstream of the first cylindrical duct and configured to guide a first gas portion from the first cylindrical duct, keep the first gas portion on the branch-one side, and to guide the first gas portion away from the second geometric plane;
a second duct branch-two disposed downstream of the first cylindrical duct and configured to guide a second gas portion from the first cylindrical duct, keep the second gas portion on the branch-two side, and to guide the second gas portion away from the second geometric plane, the first and second gas portions are fully on separate sides of the second geometric plane when they exit from the second duct branch-one and the second duct branch-two respectively;
a branch-one nozzle disposed downstream of the second duct branch-one and configured to guide the first gas portion outside the assembly in a direction substantially parallel to the axis of the first cylindrical duct;
a branch-two nozzle disposed downstream of the second duct branch-two and configured to guide the second gas portion outside the assembly in the direction substantially parallel to the axis of the first cylindrical duct; and
a third duct branch-one disposed downstream of the second duct branch-one and upstream of the branch-one nozzle,
wherein the assembly being configured to allow the first gas portion to enter into and exit from the third duct branch-one in an axial direction, the axial direction being parallel to the axis of the first cylindrical duct, the third duct branch-one having a branch-one elbow configured to guide the first gas portion away from the first geometric plane to a maximum offset position before guiding the first gas portion to a new first offset position closer to the first geometric plane, and
wherein the hot zone surface is masked from a view directed upstream into the branch-one nozzle.

18. The assembly of claim 8, wherein both the second duct branch-one and the second duct branch-two are configured to pivot about the axis of the first cylindrical duct.

19. The assembly of claim 8, wherein both the third duct branch-one and the third duct branch-two are configured to pivot about the axis of the first cylindrical duct, and
wherein the first geometric plane intersects the axis of the first cylindrical duct.

20. The assembly of claim 8, wherein the branch-one nozzle is a convergent-divergent nozzle having an internal branch-one surface and an external branch-one surface which are substantially orthogonal to the first geometric plane and guide the first gas portion out of the branch-one nozzle, the external branch-one surface is closest to the branch-two nozzle, the external branch-one surface having a fluid injector situated close to an end of the divergence, and the fluid injector adapted to inject a compressed gas into the first gas portion and thereby cause a deviation of the thrust vector produced by the branch-one nozzle.

* * * * *